(12) United States Patent
Louret et al.

(10) Patent No.: US 7,611,678 B2
(45) Date of Patent: *Nov. 3, 2009

(54) MULTI-ZONE MOVING-BED REACTION DEVICE WITH AN ADDITION OF REGENERATED OR FRESH CATALYST IN EACH ZONE

(75) Inventors: Sylvain Louret, Lyons (FR); Patrice Font, Mornant (FR); Sylvie Lacombe, Saint Genis Laval (FR); Eric Sanchez, Rueil Malmaison (FR); Laurent Simon, Lyons (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 513 days.

This patent is subject to a terminal disclaimer.

(21) Appl. No.: 11/269,883

(22) Filed: Nov. 9, 2005

(65) Prior Publication Data

US 2006/0122446 A1  Jun. 8, 2006

(30) Foreign Application Priority Data

Nov. 9, 2004  (FR) .................................. 04 11961

(51) Int. Cl.
*F27B 15/08* (2006.01)
(52) U.S. Cl. ........................ 422/145; 422/146; 422/141; 422/142; 422/188; 422/190; 422/232; 422/236
(58) Field of Classification Search ................ 422/139, 422/146, 143, 141, 142, 145, 188, 190, 232, 422/236
See application file for complete search history.

(56) References Cited

U.S. PATENT DOCUMENTS

| 2,336,041 | A | | 12/1943 | Simpson et al. |
| 3,799,866 | A | * | 3/1974 | Lengemann ................. 208/139 |
| 4,547,151 | A | | 10/1985 | Takeda et al. |
| 5,034,117 | A | * | 7/1991 | De Bonneville et al. .... 208/140 |
| 6,239,055 | B1 | * | 5/2001 | Brunet et al. ................. 502/45 |
| 6,919,048 | B2 | * | 7/2005 | Hoffmann et al. ........... 422/146 |

FOREIGN PATENT DOCUMENTS

| DE | 1028095 | 4/1958 |
| EP | 1236506 | 9/2002 |
| FR | 1041780 | 10/1953 |
| FR | 2129913 | 11/1972 |
| GB | 634534 | 3/1950 |

* cited by examiner

*Primary Examiner*—N. Bhat
(74) *Attorney, Agent, or Firm*—Millen, White, Zelano & Branigan, P.C.

(57) ABSTRACT

A reaction device includes staged zones making it possible to implement strongly endothermic or exothermic reactions. The device reduces the differences in catalytic activity between these zones using an addition of fresh or regenerated catalyst at the inlet of each reaction zone and provides an integrated heat exchanger. A process of chemical conversion employs the device for gas-phase and/or liquid-phase exothermic or endothermic reactions, and in particular for the oligomerization reaction of C2 to C12 fractions for the purpose of producing a diesel fraction.

18 Claims, 3 Drawing Sheets figure 1 figure 2 figure 3

MULTI-ZONE MOVING-BED REACTION DEVICE WITH AN ADDITION OF REGENERATED OR FRESH CATALYST IN EACH ZONE

CROSS-REFERENCE TO RELATED APPLICATION

This application is related to our application filed Nov. 7, 2005, entitled "Multi-Zone Fixed Bed Or Moving-Bed Reactor with an Integrated Heat Exchanger based on priority French application FR 0411959 filed Nov. 9, 2004.

FIELD OF THE INVENTION

This invention relates to a reaction device inside of which is carried out at least one catalytic reaction that has a significant thermal effect, generally a release of heat (so-called exothermic reactions) or sometimes an absorption of heat (so-called endothermic reactions).

It also relates to a process for oligomerization of olefinic feedstocks (i.e., a polymerization or addition that is limited to essentially 2 to 6 monomers or base molecules). It relates in particular to the reactions for addition of one olefin to another compound that is present in the feedstock, for example an olefin, a sulfur-containing compound, a nitrogen-containing compound, or an aromatic molecule, whereby the purpose of said addition reactions is to increase the molecular weight of this compound.

It relates more particularly to the oligomerization reactions starting from olefinic hydrocarbon fractions that contain 2 to 12 carbon atoms, preferably 3 to 7 carbon atoms, and more particularly 4 to 6 carbon atoms, whereby the oligomerization reactions make it possible to produce gasoline, diesel or lubricant fractions, and more particularly hydrocarbons of the diesel fraction.

The invention relates to a reaction device that comprises a reactor with several reaction zones, stacked vertically and separated by heat exchange zones and comprising the possibility of supplying each reaction zone with catalyst comprising an addition of regenerated or fresh catalyst.

EXAMINATION OF THE PRIOR ART

Patent US 2002/0011428 A1 describes a multi-staged moving-bed reactor that is intended to implement hydrotreatment reactions. One system, object of other patents (in particular U.S. Pat. No. 5,076,908), makes it possible to add and to withdraw catalyst continuously or intermittently from each stage of the reactor. The feedstock flows from one stage to the next. By contrast, the catalyst of one stage does not flow into the next stage. It was found that such a system could also be used for implementing an oligomerization reaction. Moreover, the system described does not make it possible to control effectively the temperature profile within each reaction section.

Patent WO 02/04575 describes a process for oligomerization on zeolite implementing a tubular-type fixed-bed reactor or any other reactor that can be used so as to carry out the oligomerization reaction. The patent describes a method that makes it possible to add and to draw off catalyst continuously or intermittently from the reactor. By contrast, the problem of monitoring the exothermicity of the reaction is not addressed.

Patent EP 1236506A1 describes a multi-staged reactor with a small bed thickness with an internal heat exchanger, used primarily within the framework of reactions for dehydrogenation of long paraffins. This system makes it possible to control precisely the temperature in each reaction section.

The two above-mentioned patent applications, which describe superposed or multi-staged reactors, do not, however, describe means that make it possible to preserve adequate and/or adequately homogeneous activity of the catalyst between the different stages or reactors.

In general, the deactivation of the catalysts, and in particular catalysts that comprise a zeolite that are used for the purpose of the production of diesel fractions by oligomerization, is fast. It is therefore necessary to regularly initiate the replacement of the catalyst so as to maintain the performance levels of the reactor in terms of selectivity and yield. The technology that is used for catalytic reactions with circulation and regeneration of catalyst (continuously or intermittently) is that of the moving bed that consists of a stack of catalyst grains contained in a chamber, whereby said grains are moving (at a very low average speed, continuously or intermittently) from the top to the bottom of the reactor under the effect of the force of gravity. The catalyst grains often have an essentially spherical shape to facilitate their flow, and typical dimensions of between 0.5 and 5 mm of diameter, and preferably between 1 to 4 mm. This technology makes possible a gradual replacement of the catalyst during the operation of the reactor by fresh or regenerated catalyst at the top of the reactor.

The rate of circulation of the catalyst being limited, however, there is typically much lower activity at the bottom of the reactor, where the catalyst is spent, than at the top of the reactor, where the catalyst is regenerated. This leads to differences in the catalytic activity according to the reaction zones, incurring losses of conversion and/or selectivity.

Furthermore, for the reactions with strong endothermicity, or with strong exothermicity such as the oligomerization reactions, means of heat exchange with the reaction fluid are preferably installed inside the reaction device, and in particular the reactor, so as to keep the difference in temperature between the inlet and the outlet of the reactor within desired limits.

This invention describes a reaction device and a process for chemical conversion of hydrocarbons using this device, making it possible to prevent or to limit differences in catalytic activity, in particular with the given capacity for catalyst regeneration (necessarily limited) and to provide optimum approaches to the problems linked to the implementation of strongly exothermic or endothermic reactions, in particular oligomerization reactions.

SUMMARY DESCRIPTION OF THE INVENTION

Although its field of application is more extended and relates to all of the exothermic or endothermic reaction in gas phase and/or liquid phase for which typically a maintenance of the catalytic activity and often a thermal monitoring are essential, in particular the reactions for addition of an olefin to another compound that is present in the feedstock, for example an olefin, a sulfur-containing compound, a nitrogen-containing compound, or an aromatic molecule, whereby said addition reactions are aimed at increasing the molecular weight of this compound, this invention will be illustrated in the particular case of an exothermic reaction for oligomerization of olefins within an olefinic feedstock (often comprising 20% to 100% by weight of olefins).

In particular, this device is particularly suitable for the implementation of a reaction for oligomerization of olefinic hydrocarbon fractions containing 2 to 12 carbon atoms, preferably 3 to 7 carbon atoms, and more preferably also 4 to 6 carbon atoms, making it possible to obtain hydrocarbons within the range of gasoline, diesel or lubricating oil fractions, and more particularly hydrocarbons of the diesel fraction, with a typical distillation interval of between 160 and 370° C., in particular between 200 and 365° C.

It is important to avoid significant differences in the catalytic activity between the different reaction zones that generate conversion losses.

In addition, the oligomerization reaction is strongly exothermic. Too high a temperature promotes cracking reactions of oligomerized compounds and is therefore not desirable.

Too low a temperature in certain reaction zones limits the conversion into adequately heavy compounds that are sought in the composition of a diesel fraction. It is therefore desirable to precisely monitor the temperatures within various reaction zones. In particular, it is advantageous to adjust the temperature level of a catalytic reaction zone based on the activity of the catalyst within said zone.

To solve the above-mentioned technical problems, the invention proposes a reaction device that comprises means for maintaining a significant catalytic activity with small differences between the different reaction zones, implementing, typically at the inlet of each reaction zone, an addition of fresh or regenerated catalyst, for its mixing with at least a portion of the (partially) spent catalyst that is obtained from the upstream reaction zone. It also proposes a preferred variant of the device with integration of thermal means for heating or cooling the reaction fluid at a constriction in the path of a catalyst that is used for the implementation of this addition of fresh or regenerated catalyst.

The selectivity and the conversion are thus appreciably increased, relative to the prior art, in particular for oligomerization reactions.

The invention also proposes a process for carrying out chemical reactions in this device, in particular a process for oligomerization of olefinic feedstocks.

DETAILED DESCRIPTION OF THE INVENTION

Figure 1:
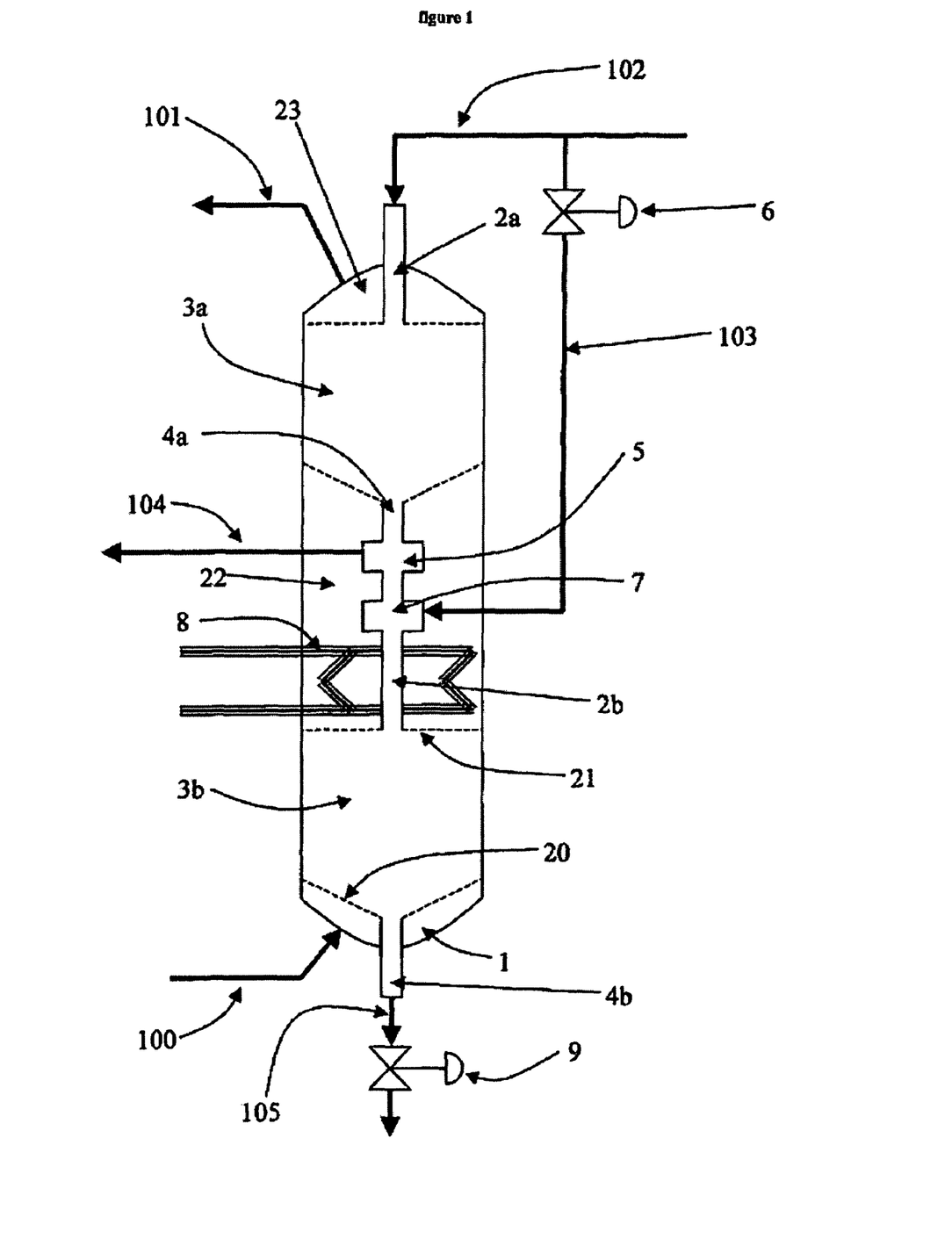
FIG. 1 shows a view of the reaction device in its basic configuration.
Figure 2:
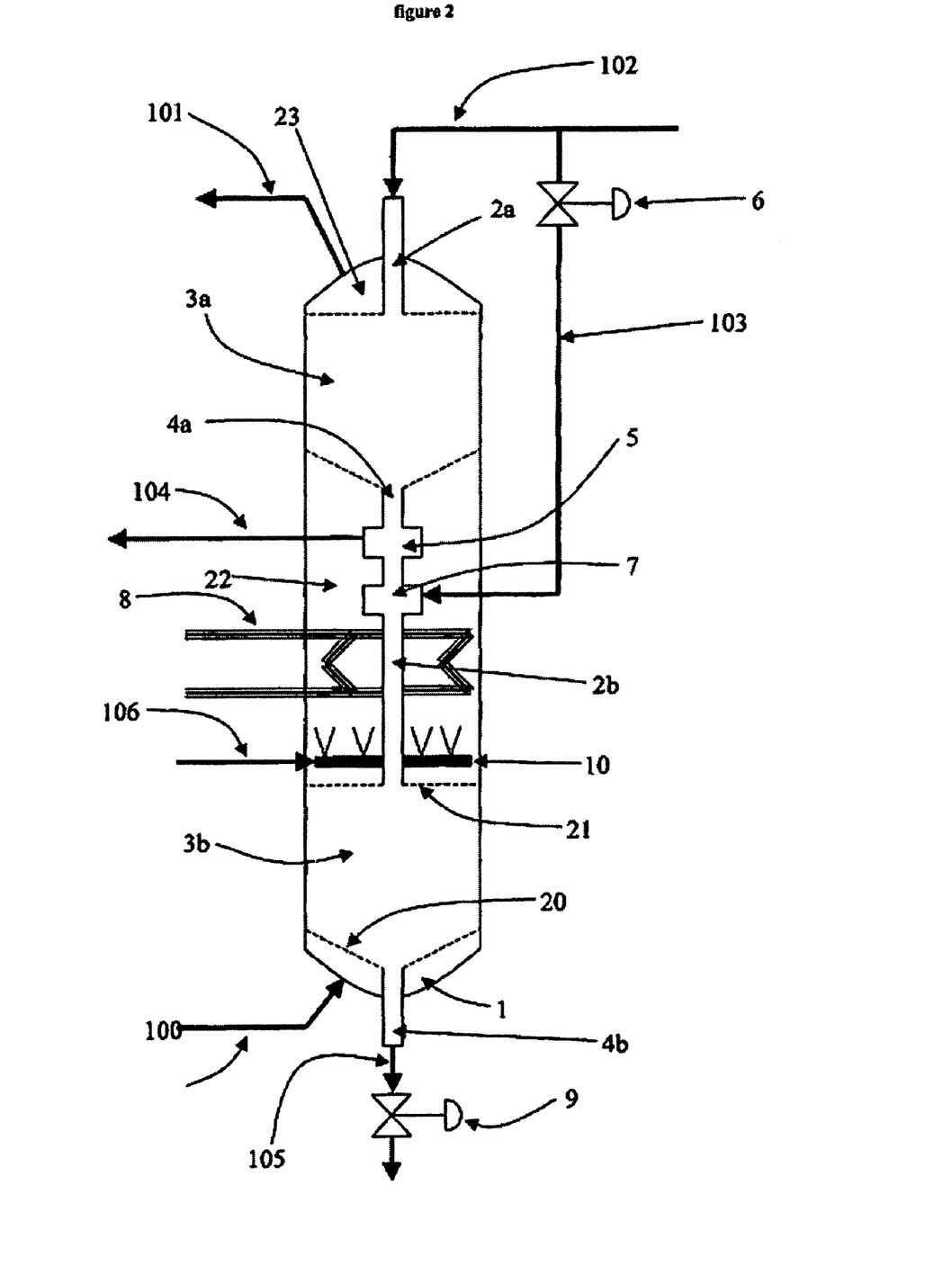
FIG. 2 shows a view of the reaction device in a variant that comprises an injection of an additional reaction fluid between two reaction zones.
Figure 3:
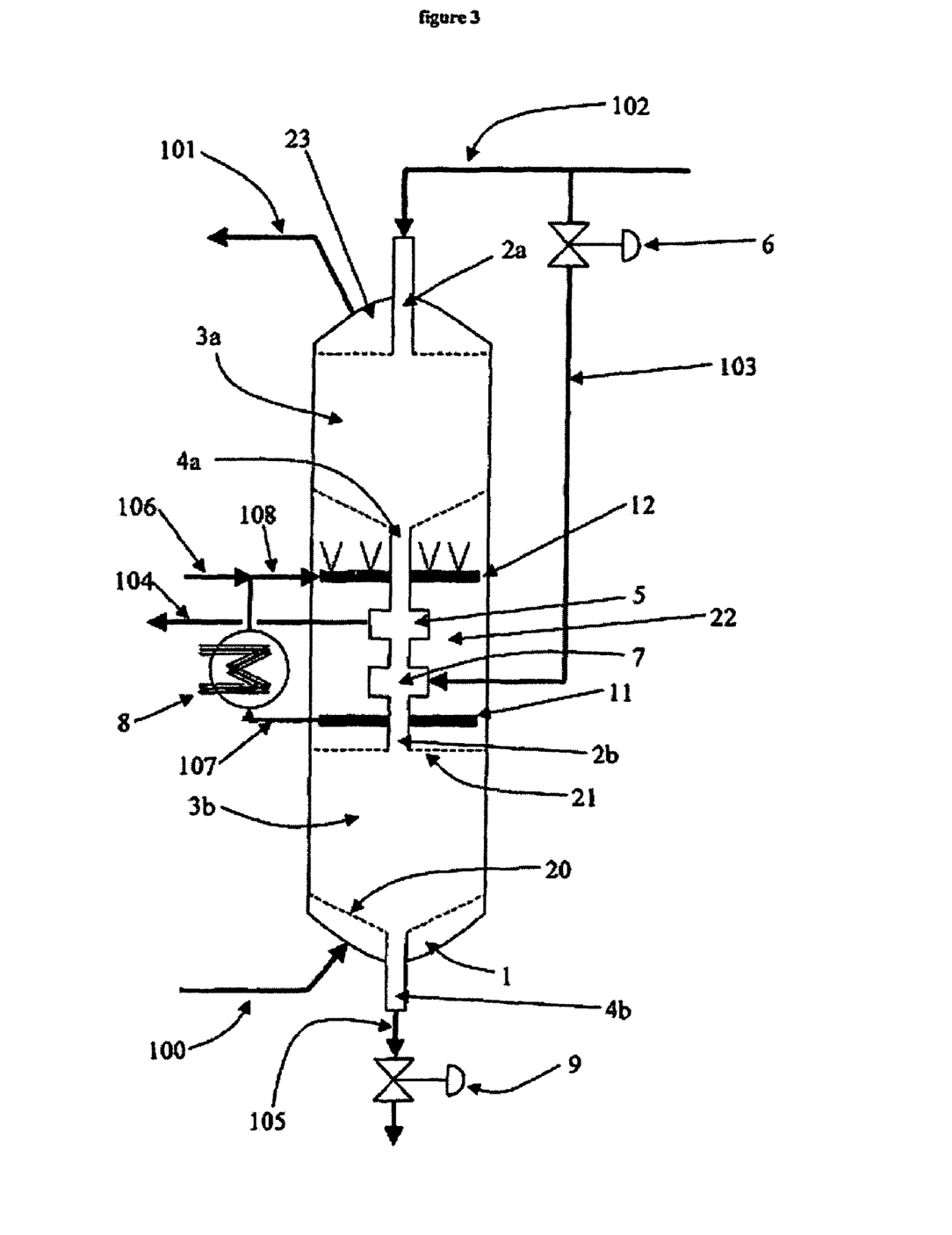
FIG. 3 shows a view of the reaction device in a variant that comprises at least a portion of heat exchange means outside of the reaction chamber.

The invention will be better understood with reference to FIGS. 1 to 3 that illustrate the different embodiments of the invention without, however, limiting its scope.

The invention is illustrated in its basic configuration by FIG. 1.

In a general form, the invention relates to a reaction device that comprises a catalytic reactor of elongated shape along an essentially vertical axis, whereby this reactor comprises several vertically-staged catalytic reaction zones in the same chamber and whereby this reactor is adapted to circulating at least one moving-bed granular catalyst that descends successively in each of the reaction zones and that comprises means (100) for introducing and means (101) for evacuating the reaction fluid, means (102) for bringing in fresh or regenerated catalyst at the top of the reaction chamber, and means (105) for evacuating spent catalyst in the lower portion of the chamber, whereby this reactor comprises in particular:

a) An upper reaction zone Za (3a), and a reaction zone Zb (3b), located just below upper reaction zone Za, whereby these reaction zones Za and Zb are two successive reaction zones that are connected directly, on the one hand, by a passage of reaction fluid and, on the other hand, by a passage of catalyst from zone Za to zone Zb.

b) Means (2a) for introducing regenerated catalyst and/or fresh catalyst (102) in upper reaction zone Za (3a), c) Means (4a) for collecting spent catalyst that is obtained from upper reaction zone Za, connected to:

d) Means, for example a mixing chamber (7), for mixing at least a portion of the spent catalyst thus collected with an addition of fresh or regenerated catalyst, connected to:

e) Means for introducing the catalyst mixture thus produced in reaction zone Zb (3b).

The two zones Za and Zb are successive reaction zones according to the invention, which means that the effluents of one of these zones feed the other zone without passing through another reaction zone. They are typically separated by a constriction of the catalyst passage, located at the collection of (typically partially) spent catalyst that is obtained from Za.

The invention makes it possible to increase the catalytic activity of the catalyst that feeds zone Zb by an addition of regenerated and/or fresh catalyst and therefore to reduce the differences in catalytic activity between the reaction zones.

The device that is shown in FIG. 1 preferably comprises means for draw-off and evacuation (104) of a portion of said spent catalyst that is obtained from upper reaction zone Za connected to the collecting means. This makes it possible to eliminate a portion (for example 10 to 70%, and often 15 to 50%) of the spent catalyst before the regenerated and/or fresh catalyst is introduced.

Thus, the average activity of the catalyst in the mixture feeding Zb is increased, without in general significantly increasing the total flow rate of catalyst entering Zb, and even by keeping constant the flow rate of catalyst circulating in Za and in Zb. At a constant total flow rate of fresh and/or regenerated catalyst, the invention makes it possible to obtain a certain rebalancing of the catalytic activity between the different reaction zones.

This addition of regenerated and/or fresh catalyst can also represent, for example, 10 to 70%, and often 15 to 50%, of the catalyst that feeds Za at the top of the reactor, or else that feeds Zb.

Typically, the two successive reaction zones Za and Zb are connected by a circuit for circulation of the reaction fluid that passes through a heat exchange means (8), internal or external to said reactor, for example a heating furnace or a heat exchanger (typically with an auxiliary thermal fluid) for heating or cooling reaction fluid. Preferably, this heat exchange means (8) is placed inside the reactor, in an intermediate zone that is located between two successive reaction zones Za and Zb. This can advantageously be a heat exchanger that is located in the intermediate zone, at a constriction in the path of a catalyst from zone Za to zone Zb.

Optionally, the intermediate zone comprises means (10) for introducing one or more additional reaction fluids (106) and means for mixing this fluid or these fluids with the reaction fluid that circulates between successive reaction zones Za and Zb. It can be useful in particular to add a new chemical reagent to carry out a reaction subsequent to the one carried out in the upstream zone, for example a reaction for alkylation of an aromatic molecule or a mixture of aromatic compounds, and/or to introduce a hydrogen-rich recycling gas (comprising more than 50 mol % and often more than 70 mol % of H2) so as to increase the amount of hydrogen present. This gas can also have a thermal effect of heating or, more frequently, cooling effluents before they return to the downstream reaction zone.

The device of the invention and all its variants as described in this application can be used in particular within the framework of a process for chemical conversion of hydrocarbons, and in particular a process for oligomerization of olefinic feedstocks that have 2 to 12 carbon atoms, whereby this process or these processes constitute another object of the invention.

In such a process, in particular for oligomerization, the typical conditions are as follows: the pressure is between 0.1 and 10 MPa and preferably between 0.3 and 7 MPa, the temperature is between 40 and 600° C. and preferably between 60 and 400° C., the hourly volumetric flow rate VVH is between 0.01 and 100 $h^{-1}$ and preferably between 0.4 and 30 $h^{-1}$, and the catalyst circulates in each reaction zone at a speed (average) of between 1 cm/hour and 200 cm/hour and preferably between 2 cm/hour and 100 cm/hour.

The invention is particularly suitable for processes in which the operating conditions are selected: temperature, pressure, VVH, so as to limit the temperature variation within each of the reaction zones to one or more values of between 2° C. and 50° C.

DETAILED DESCRIPTION OF THE FIGURES

Reference will now be made again to FIG. 1. In the device shown, the catalyst passes through all of the reaction zones in a downward flow, and the feedstock also passes through all of the reaction zones but counter-current to the catalyst. The reaction zones shown are of the axial reactor type. However, a configuration in which the reaction fluid would circulate co-current to the catalyst, i.e., from top to bottom, is also perfectly possible within the scope of the invention. Furthermore, the reaction zones can also be of the radial reactor type (and not only of the axial reactor type).

The fresh and/or regenerated catalyst is fed, primarily in general, to the top of the reactor via line (102), then tube (2a). This catalyst flows slowly, continuously or intermittently, into a zone Za, referenced (3a) in FIG. 1, which is the upper reaction zone. In the low portion of this zone, it is collected in a collecting zone (4a), then it flows into chamber (5). A fraction of this catalyst, partially spent, is drawn off via tube (104), typically to be regenerated. Chamber (5) can be provided with means (not shown) to facilitate the extraction of a granular product such as catalyst, for example an extracting screw or a pneumatic transport drum or a fluidized bed or any other means known to one skilled in the art. It is also possible to use a tube (104) that is inclined by at least 60° relative to the horizontal line and optionally injections of aeration gas of the catalyst (for example nitrogen) to facilitate the evacuation of the catalyst.

The non-extracted portion of the catalyst that is present in chamber (5) flows into mixing chamber (7) to be mixed with another portion of the fresh and/or regenerated catalyst, introduced via line (103), via valve (6). It is possible to use a tube (103) that is inclined by at least 60° relative to the horizontal line, including in its end portion, and optionally injections of aeration gas of the catalyst (for example nitrogen) to facilitate the introduction of fresh and/or regenerated catalyst.

Mixing chamber (7) can be equipped with means (not shown) to facilitate the mixing of fresh/regenerated catalyst and partially spent catalyst. It is possible in particular to use a rotating basket for stirring the catalyst in zone (7) or else stirring blades that are located in zone (7) and moved via an external motor. It is also possible to use a fluidized bed or any other known granule mixing system.

The thus formed mixture of catalysts has a catalytic activity that has been increased relative to that of the spent catalyst that is obtained from zone Za. This mixture passes through a constriction path (2b) then supplies zone Zb, referenced (3b) in FIG. 1, which is immediately less than Za (from the viewpoint of reaction zones).

The spent catalyst that is obtained from zone Zb (3b) circulates in an extracting tube (4b) then is evacuated from the reactor via tube (105) on which valve (9) is found. It is then sent to a regeneration zone (not shown) via a system for particle transport by means of a liquid or gaseous transport fluid (for example nitrogen), according to technologies that are well known to one skilled in the art relative to the moving bed. It is possible in particular to use, at the level of tube (105) or below valve (9), a flask with the formula of the spent catalyst that makes it possible to store a determined amount of catalyst before its sequential evacuation via pneumatic transport, generally by means of a primary fluid for aeration of the catalyst and a secondary transport fluid.

The technologies that make it possible to introduce, to extract, to mix or to transport granular products are generic technologies that are well known to one skilled in the art, to which the invention is not linked.

The regeneration zone of the catalyst, not shown, can be equipped with a gas classifier or any other means that makes it possible to separate the fine particles that are created during various operations for transport of catalyst. The regenerated catalyst (in particular after a controlled oxidation of carbon deposits) is typically recycled via tubes (102) and (103) with an added portion of fresh catalyst. A fraction of the catalyst of the loop (often spent catalyst) is generally evacuated to make possible the addition of fresh catalyst by keeping constant the total amount of catalyst used.

The reaction fluid, for example a C4-C6 olefinic hydrocarbon feedstock (essentially having 4 to 6 carbon atoms), is fed via tube (100) into feed chamber 1, passes through initial reaction zone Zb (3b) filled with catalyst, then intermediate zone (22) that does not contain catalyst, then returns to final reaction zone Za (3a) filled with catalyst, then returns to chamber (23) before being evacuated via tube (101). Reaction zones Za and Zb are advantageously provided at the upper and lower portions with perforated grids (shown in dotted lines in the figures) to make possible the path of reaction fluid. These grids can be inclined by an angle of 60° or more, in the lower portion, to facilitate the flow of the catalyst.

A heat exchanger (8) with thermal fluid circulation is located inside the reactor in intermediate zone (22) (itself located inside the reactor) to carry out a heat exchange with the reaction fluid that moves between Zb and Za. This heat exchanger is advantageously located at constriction 2b of the catalyst path because of the space thus cleared inside the reactor.

This heat exchanger generally makes use of a heating or cooling fluid that circulates inside tubes, all of the tubes forming, for example, one or more pins extending into the reaction fluid in intermediate zone (22). The exchanger, however, can be of any type that is known to one skilled in the art, whereby the invention is in no way limited to a particular technology of this exchanger.

Various pressurized fluids can be used as a heating or cooling fluid: water vapor, air, water, hydrogen or hydrogen-rich recycling gas, nitrogen, molten salts, aromatic oil, etc.

FIG. (2) shows another reaction device according to this invention, comprising the same elements as those of the device of FIG. 1. In addition, it comprises a tube (106) for the supply of an additional reaction fluid, for an added portion of reagent and/or an added portion of hydrogen. This fluid is distributed into intermediate zone (22) via a distribution line (10) to facilitate its homogeneous mixing with the reaction fluid that is obtained from zone Zb. The mixing is also promoted by the fact that intermediate zone (22) is free of catalyst.

In the device of FIG. 3, the reaction device comprises a heat exchanger (8) that is external to the reactor. The reaction fluid that is obtained from zone Zb is collected by tube (11), feeds exchanger (8), then is reintroduced into the reactor, after the addition of additional reaction fluid, via tube (108) and distribution line (12), which are also part of the reaction device.

The advantages of the reaction device(s) according to this invention relative to the known devices of the prior art are:
- a clear improvement in performance levels (conversion, selectivity, yield)
- a more significant reliability of the installation due to the simplicity and the compactness of the means used, in particular heat exchange means that are implemented
- a reduced cost of construction and installation because of the compactness.

A typical operation of the reactor of FIG. 1 is as follows: the flow rate of the added portion of regenerated catalyst or optionally fresh catalyst is defined so as to maintain a determined level of activity on each reaction zone. For example, this catalyst addition flow rate can be defined based on a characteristic of the reaction fluid at the reaction zone outlet. This characteristic can be a temperature, a composition, a conversion, or any other physico-chemical characteristic that can be measured on line. The correlations that link one or more of these values that can be measured on line and the activity level of the catalyst depend on the reaction that is implemented, the type of catalyst and its speed of circulation. A simple means is in particular to control the conversion in zone Zb or the temperature variation (delta T) of the reaction fluid in this zone, or else the outlet temperature of this zone, by action on the addition flow rate of the regenerated and/or fresh catalyst: If the measured value of delta T is less than the value that is provided (typically depending on the initial composition of the feedstock), or if the value of the outlet temperature of the zone corresponds to an inadequate reaction, the addition flow rate of regenerated and/or new catalyst is increased in this zone, and, conversely, the added portion is reduced if the conversion in the zone (deduced from delta T or the outlet temperature) is too significant. It is possible to simultaneously evacuate the same amount of spent catalyst as that of the added portion of catalyst before carrying out the mixing to keep constant the overall flow rate of catalyst in zone Zb.

The flow rate of the added portion of catalyst can therefore be entirely automated. Alternatively, it is possible to be adjusted at certain times (for example once or twice per day) by the operator, based in particular on temperatures and/or the above-mentioned delta T.

The heating or cooling of reaction fluid in exchanger (8) (delta T) can be controlled in particular by the flow rate or the temperature level of the thermal fluid that circulates in exchanger (8).

The devices of FIGS. 2 and 3 operate analogously. In these devices, an added portion of reagents and/or hydrogen that is fed by tube (106) is used. This added portion typically has a controlled flow rate and temperature.

The catalyst that circulates in the reaction device according to the invention can be of various types. In the case of an oligomerization reaction device, it is possible to use in particular any type of acid catalyst that allows the oligomerization, for example an amorphous silica-alumina-type catalyst or a solid phosphoric acid-type catalyst or an ion exchange resin-type catalyst, or then a catalyst that exhibits a selectivity of shape, for example a zeolitic catalyst, for example a zeolitic catalyst of the structural type MFI, FER, EUO, TON, LTL, MOR, MTT, MEL, MWW, MTW or the zeolites NU-86, NU-87, NU-88 and IM-5.

These zeolitic acid catalysts can be used as is or after modifications, whereby said modifications preferably affect the acidity of the catalyst, and whereby the term acidity designates both the inherent force of the acid sites and the concentration of acid sites.

These modifications can affect the framework of the zeolite, for example if it is a dealuminification by steam treatment or by acid treatment, and/or can affect the surface of the zeolite, for example (i) by exchanges of protons by cations of alkaline types, (ii) by inert phase depositions on the surface of zeolites.

The preferred operating conditions are those that are used in a standard manner for the oligomerization of olefins by catalysts of solid acid type:
- a temperature of between 100° C. and 300° C.
- a pressure of between 0.1 and 7 MPa
- a VVH (volumetric flow rate expressed as the ratio of the volumetric flow rate of feedstock to the catalyst volume contained in the reaction zone) of between 0.01 and 100 $h^{-1}$.

The device according to the invention is particularly suited to olefin oligomerization reactions, but it can be used more generally for any type of exothermic or endothermic reaction, taking place in gas and/or liquid phase, and for which a fine control of the temperature profile in each reaction zone is necessary, in particular the reactions for addition of one olefin to another compound that is present in the feedstock, for example an olefin, a sulfur-containing compound, a nitrogen-containing compound, an aromatic molecule, said addition reactions being aimed at increasing the molecular weight of this compound, in particular the reactions for alkylation of thiophenic compounds by olefins, the metathesis of olefins. The device according to the invention can also be used for the skeletal isomerization reactions of light olefins, such as, for example, the olefins with 4 or 5 carbon atoms.

In the case of exothermic reactions, the thermal cooling fluid (coolant) can be any fluid that is suitable for carrying out the heat exchange under good conditions, in particular by observing a mean temperature difference between the reaction fluid and the cooling fluid of at least 5° C. and preferably at least 10° C.

The invention is in no way tied to a particular cooling or heating fluid.

EXAMPLES

The following examples relate to applications of the reaction device according to the invention to reactions for oligomerization of fractions C3, C4 and C6.

Examples 1, 3 and 5 are in accordance with the prior art. Examples 2, 4 and 6 are in accordance with the invention and are combined respectively with Examples 1, 3 and 5 to bring out the effect of the device according to the invention relative to a fixed-bed implementation.

Example 1

According to the Prior Art

This example relates to the reaction for oligomerization of an unsaturated C3 fraction on a fixed bed.

A dealuminified mordenite zeolite-type catalyst that has an Si/Al molar ratio of 57 was tested for the oligomerization reaction of propene, after being formed into balls with an alumina binder. The reaction is carried out in a conventional fixed-bed reactor. The catalyst that is used is shaped in spherical balls that are 3 mm in diameter.

The feedstock that is used for this test is a feedstock that is obtained from steam cracking that contains 94% by weight of propene and 6% by weight of propane.

The conditions were selected so as to optimize the formation of the diesel fraction in the oligomerate produced.

The operating conditions are as follows:

| | |
|---|---|
| Temperature of the feedstock at the inlet of the reactor | 210° C. |
| Pressure | 5.5 MPa |
| VVH | 0.7 h$^{-1}$ |

(VVH = volumetric flow rate of feedstock per volume of catalyst)

The results that are obtained are presented in Table 1.

TABLE 1

| | |
|---|---|
| Zeolite | MOR |
| Si/Al Molar Ratio | 57 |
| Ball Composition | 20% by Weight of Al$_2$O$_3$/80% by Weight of Zeolite |
| Reactor Inlet Temperature (° C.) | 210 |
| Reactor Outlet Temperature (° C.) at the Beginning of the Test | 247 |
| Deactivation of the Catalyst (% of Conversion Lost Per Day) | 1.4 |
| C5+ Oligomer (% by Weight) | 83.3 |
| Diesel Fraction (>180° C., % by Weight) | 77.6 |
| Engine Cetane Number* | 38 |

*After hydrogenation

Example 2

According to the Invention

Example 2 corresponds to the same reaction as that of Example 1, using the same catalyst that is implemented in a reaction device according to the invention, such as the one of FIG. 1.

The reactor comprises two reaction zones denoted as Zb (initial zone (3b)) and Za (final zone (3a)), in a series, separated by an intermediate zone that comprises a water-cooling system constituting the heat exchanger.

The feedstock, the test conditions and the catalyst are the same as for Example 1.

The feedstock and the catalyst circulate in counter-current.

The volumetric flow rate of feedstock per volume of catalyst (VVH) was calculated based on the total catalyst mass in the two reaction zones. The addition of fresh and regenerated catalyst is done in such a way as to maintain stable conversion in the two reaction zones.

20% of the spent catalyst that is obtained from the upper reaction zone is drawn off and is replaced with an identical amount of regenerated catalyst to increase the catalytic activity in the lower reaction zone.

The temperature of the cooling liquid is regulated so that the reaction temperature at the inlet of the second reaction zone is equal to 210° C. The cooling fluid that is used is the water that is introduced at 25° C.

The results that are obtained are presented in Table 2.

TABLE 2

| | |
|---|---|
| Zeolite | MOR |
| Si/Al Molar Ratio | 57 |
| Reaction zone inlet temperature Zb (° C.) | 210 |
| Reaction zone outlet temperature Zb (° C.) | 227 |
| Reaction zone inlet temperature Za (° C.) | 210 |
| Reaction zone outlet temperature Za (° C.) | 225 |
| C5+ oligomer (% by weight) | 86.5 |
| Diesel fraction (>180° C., % by weight) | 81.2 |
| Engine cetane number* | 38 |

*After hydrogenation

Example 3

According to the Prior Art

Example 3 consists of a reaction for oligomerization of an unsaturated C4 fraction that is implemented in a fixed bed. The catalyst that is used is in the form of spherical balls that are 3 mm in diameter.

This dealuminified mordenite zeolite-type catalyst that has an Si/Al molar ratio of 57 is used for the oligomerization reaction of a fraction that contains 60% by weight of unsaturated butene, 30% by weight of isobutene, 11% by weight of n-butane and 26% by weight of isobutane.

The reaction is conducted in a conventional fixed-bed reactor.

The conditions were selected so as to optimize the formation of the diesel fraction in the oligomerate produced. The operating conditions are as follows:

| | |
|---|---|
| Temperature of the feedstock at the inlet of the reactor | 210° C. |
| Pressure | 6.0 MPa |
| VVH | 1.0 h$^{-1}$ |

(VVH = volumetric flow rate of feedstock per volume of catalyst)

The results that are obtained are presented in Table 3.

TABLE 3

| | |
|---|---|
| Zeolite | MOR |
| Si/Al Molar Ratio | 57 |
| Ball Composition | 40% by Weight of Al$_2$O$_3$/60% by Weight of Zeolite |
| Reactor Inlet Temperature (° C.) | 210 |
| Reactor Outlet Temperature (° C.) at the Beginning of the Test | 233 |
| Deactivation of the Catalyst (% of Conversion Lost Per Day) | 0.9 |
| Diesel Fraction (>180° C., % by Weight) | 83.6 |
| Engine Cetane Number* | 40 |

*After hydrogenation

Example 4

According to the Invention

Example 4 consists in implementing the same reaction as that of Example 3 in a reaction device according to the invention, such as the one of FIG. 1, by using the same catalyst.

The reaction is conducted in a reactor that comprises two reaction zones in a series, denoted Zb (initial zone (3b)) and Za (final zone (3a)), separated by an intermediate zone that comprises a water-cooling system constituting the heat exchanger.

The feedstock, the test conditions and the catalyst are the same as for Example 3.

The feedstock and the catalyst circulate in counter-current. The volumetric flow rate of feedstock per volume of catalyst (VVH) was calculated based on the total catalyst mass in the two reaction zones.

The addition of fresh and regenerated catalysts is done in such a way as to maintain stable conversion in the two reaction zones.

20% of the spent catalyst that is obtained from the upper reaction zone is drawn off and is replaced with an identical amount of regenerated catalyst to increase the catalytic activity in the lower reaction zone.

The cooling liquid temperature (water at 25° C.) is regulated so that the reaction temperature at the inlet of the second reaction zone is equal to 210° C.

The results that are obtained are presented in Table 4.

TABLE 4

| Zeolite | MOR |
|---|---|
| Si/Al Molar Ratio | 57 |
| Reaction zone inlet temperature Zb (° C.) | 210 |
| Reaction zone outlet temperature Zb (° C.) | 222 |
| Reaction zone inlet temperature Za (° C.) | 210 |
| Reaction zone outlet temperature Za (° C.) | 219 |
| Diesel fraction (>180° C., % by weight) | 88.1 |
| Engine cetane number* | 40 |

*After hydrogenation

Example 5

According to the Prior Art

Example 5 consists in implementing the reaction for oligomerization of an unsaturated C6 fraction by means of a dealuminified mordenite zeolite-type catalyst that has an Si/Al molar ratio of 57. This catalyst is used in the form of spherical balls that are 3 mm in diameter.

The reaction is carried out in a conventional fixed-bed reactor.

The feedstock that is used for this test contains 72% by weight of olefinic unsaturated C6, 7% by weight of paraffinic unsaturated C6, 18% of olefinic unsaturated C9, and 3% of olefinic unsaturated C12. The conditions were selected so as to optimize the formation of the diesel fraction in the oligomerate produced. The operating conditions are as follows:

| Temperature of the feedstock at the inlet of the reactor | 230° C. |
|---|---|
| Pressure | 6.0 MPa |
| VVH | 1 h$^{-1}$ |

(VVH = volumetric flow rate of feedstock per volume of catalyst)

The results that are obtained are presented in Table 5.

TABLE 5

| Zeolite | MOR |
|---|---|
| Si/Al Molar Ratio | 57 |
| Ball Composition | 20% by Weight of Al$_2$O$_3$/ 80% by Weight of Zeolite |
| Reactor Inlet Temperature (° C.) | 230 |
| Reactor Outlet Temperature (° C.) | 244 |
| Deactivation of the Catalyst (% of Conversion Lost Per Day) | 1.2 |
| Diesel Fraction (>180° C., % by Weight) | 60.7 |
| Engine Cetane Number* | 43 |

*After hydrogenation

Example 6

According to the Invention

Example 6 consists in implementing the same reaction as that of Example 5 in a reaction device according to the invention, such as the one of FIG. 1.

The reaction is conducted in a reactor that comprises two reaction zones in a series denoted as Zb (initial zone (3b)) and Za (final zone (3a)), separated by an intermediate zone that comprises a water-cooling system constituting the heat exchanger.

The feedstock, the test conditions and the catalyst are the same as for Example 5.

The feedstock and the catalyst circulate in counter-current. The volumetric flow rate of feedstock per volume of catalyst (VVH) was calculated based on the total catalyst mass in the two reaction zones. The addition of fresh and regenerated catalysts is done in such a way as to maintain stable conversion in the two reaction zones.

20% of the spent catalyst that is obtained from the upper reaction zone is drawn off and is replaced with an identical amount of regenerated catalyst to increase the catalytic activity in the lower reaction zone.

The cooling liquid temperature is regulated so that the reaction temperature at the inlet of the second reaction zone is equal to 230° C. The cooling fluid is water at 25° C. The results that are obtained are presented in Table 6.

TABLE 6

| Zeolite | MOR |
|---|---|
| Si/Al Molar Ratio | 57 |
| Reaction zone inlet temperature Zb (° C.) | 230 |
| Reaction zone outlet temperature Zb (° C.) | 238 |
| Reaction zone inlet temperature Za (° C.) | 230 |
| Reaction zone outlet temperature Za (° C.) | 235 |
| Diesel fraction (>180° C., % by weight) | 65.4 |
| Engine cetane number* | 43 |

*After hydrogenation

The examples above show that the use of the reaction device according to this invention for the oligomerization reaction of olefinic feedstocks ranging from C3 to C6 provides several major improvements:

The addition of new catalyst makes possible an at least partial rebalancing of the catalytic activity between the reaction zones, which is favorable to the yield of the diesel fraction.

The continuous regeneration system of a portion of the catalyst makes it possible to operate without having to stop the unit to change the catalyst.

The heat exchange zone that is located between the two reaction zones makes possible an improvement of the homogeneity of the temperature in the two reaction zones. For example, in the case of Examples 5 and 6, the temperature difference between the inlet and the outlet of each of the zones is 8° C. (zone 1) and 5° C. (zone 2), in comparison to a difference of 14° C. in the case of a fixed bed. This homogeneity of temperature, combined with maintaining catalytic activity without significant differences, brings about an increase in yield of the diesel fraction of 4.5 points in the case of Example 2 relative to Example 1; 3.6 points in the case of Example 4 relative to Example 3, and 4.7 points in the case of Example 6 relative to Example 5.

Finally, the reactor is compact, has a high catalytic volume, and can, moreover, comprise an integrated heat exchanger.

The entire disclosures of all applications, patents and publications, cited herein and of corresponding French application No. 0411961, filed Nov. 9, 2004 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A reaction device comprising a catalytic reactor of elongated shape along an essentially vertical axis, said reactor comprising several vertically-staged catalytic reaction zones of similar diameters, said reactor being suitable for the circulation of at least one moving-bed granular catalyst that descends successively into each of the reaction zones and comprises means (100) for introducing and means (101) for evacuating a reaction fluid, means (102) for introducing fresh or regenerated catalyst at the top of the reactor, and means (105) for evacuating spent catalyst from a lower part of the reactor, said reactor comprising:
   a) an upper reaction zone (3a), and a reaction zone (3b), located below upper reaction zone (3a), reaction zones are (3a) and (3b) being two successive reaction zones connected directly, on the one hand, by a path for reaction fluid and path for catalyst from zone (3a) to zone (3b).
   b) means (2a) for introducing regenerated catalyst and/or fresh catalyst from the top of the reactor into upper reaction zone (3a), and
   c) means (4a) within said reactor between reaction zones (3a) and (3b) for collecting spent catalyst obtained from upper reaction zone (3a), connected to:
   d) means (7) within said reactor below said means (4a) for collecting spent catalyst and intermediate zone (3a) and (3b) for mixing at least a portion of spent catalyst thus collected with an addition of fresh or regenerated catalyst, connected to:
   e) conduit (103) located outside said path for catalyst from zone (3a) to zone (3b) and entering said mixing zone for providing said addition of fresh or regenerated catalyst, and
   f) means for passing the catalyst mixture thus produced in said means for mixing to the reaction zone (3b).

2. A device according to claim 1, comprising means (104) connected to said collecting means (4a) for drawing-off and evacuating a portion of said spent catalyst obtained from upper reaction zone (3a).

3. A device according to claim 2, in which two successive reaction zones (3a) and (3b) are connected by a circuit for circulation of the reaction fluid that passes through a heat exchange means (8) that is internal or external to said reactor.

4. A device according to claim 3, in which said heat exchange means (8) is located inside the reactor, in an intermediate zone (22) located between two successive reaction zones (3a) and (3b).

5. A device according to claim 4, in which said heat exchange means (8) is a heat exchanger located in said intermediate zone at a constriction in the path of a catalyst from zone (3a) to zone (3b).

6. A device according to claim 3, in which said intermediate zone comprises means (10) for introducing one or more additional reaction fluids (106) and for mixing this fluid or these fluids with the reaction fluid that circulates between successive reaction zones (3a) and (3b).

7. A device according to claim 4, in which said intermediate zone comprises means (10) for introducing one or more additional reaction fluids (106) and for mixing this fluid or these fluids with the reaction fluid that circulates between successive reaction zones (3a) and (3b).

8. A device according to claim 2, in which said intermediate zone comprises means (10) for introducing one or more additional reaction fluids (106) and for mixing this fluid or these fluids with the reaction fluid that circulates between successive reaction zones (3a) and (3b).

9. A reactor system according to claim 2 further comprising a source of fresh and/or regenerated granular catalysts;
   conduit means connecting said source with both the top of the reactor and the means (7) for mixing, said conduit means comprising valve means for regulating relative amounts of fresh and/or regenerated catalysts to be transported to the top of the reactor and to the means for mixing, and for replenishing withdrawn spent catalysts.

10. A device according to claim 1, in which two successive reaction zones (3a) and (3b) are connected by a circuit for circulation of the reaction fluid that passes through a heat exchange means (8) that is internal or external to said reactor.

11. A device according to claim 10, in which said heat exchange means (8) is located inside the reactor, in an intermediate zone (22) located between two successive reaction zones (3a) and (3b).

12. A device according to claim 11, in which said heat exchange means (8) is a heat exchanger located in said intermediate zone at a constriction in the path of a catalyst from zone (3a) to zone (3b).

13. A device according to claim 11, in which said intermediate zone comprises means (10) for introducing one or more additional reaction fluids (106) and for mixing this fluid or these fluids with the reaction fluid that circulates between successive reaction zones (3a) and (3b).

14. A device according to claim 10, in which said intermediate zone comprises means (10) for introducing one or more additional reaction fluids (106) and for mixing this fluid or these fluids with the reaction fluid that circulates between successive reaction zones (3a) and (3b).

15. A device according to claim 11, in which said intermediate zone comprises means (10) for introducing one or more additional reaction fluids (106) and for mixing this fluid or these fluids with the reaction fluid that circulates between successive reaction zones (3a) and (3b).

16. A device according to claim 12, in which said intermediate zone comprises means (10) for introducing one or more additional reaction fluids (106) and for mixing this fluid or these fluids with the reaction fluid that circulates between successive reaction zones (3a) and (3b).

17. A device according to claim 5, in which said intermediate zone comprises means (10) for introducing one or more additional reaction fluids (106) and for mixing this fluid or these fluids with the reaction fluid that circulates between successive reaction zones (3a) and (3b).

18. A device according to claim 1, wherein said conduit (103) enters laterally through the reactor into the means (7) for mixing.

* * * * *

UNITED STATES PATENT AND TRADEMARK OFFICE
CERTIFICATE OF CORRECTION

PATENT NO. : 7,611,678 B2 Page 1 of 1
APPLICATION NO. : 11/269883
DATED : November 3, 2009
INVENTOR(S) : Louret et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 872 days.

Signed and Sealed this

Twelfth Day of October, 2010

David J. Kappos
*Director of the United States Patent and Trademark Office*